US006548755B2

(12) United States Patent
Wu

(10) Patent No.: US 6,548,755 B2
(45) Date of Patent: Apr. 15, 2003

(54) POWER SUPPLY ADAPTER WITH FOLDABLE PLUG

(75) Inventor: Michael Wu, Hsin Tien (TW)

(73) Assignee: Formosa Electronic Industries Inc., Taipei Hsien (TW)

( * ) Notice: Subject to any disclaimer, the term of this patent is extended or adjusted under 35 U.S.C. 154(b) by 64 days.

(21) Appl. No.: 09/932,956

(22) Filed: Aug. 21, 2001

(65) Prior Publication Data

US 2003/0037954 A1 Feb. 27, 2003

(51) Int. Cl.[7] .......... H02G 3/08

(52) U.S. Cl. .......... 174/50; 174/53; 174/135; 174/60; 220/4.02; 363/142; 439/23; 439/29

(58) Field of Search .......... 174/50, 53, 59, 174/60, 135; 439/23–25, 31, 29; 363/142, 143; 361/823, 825; 220/4.02

(56) References Cited

U.S. PATENT DOCUMENTS 2,070,211 A * 2/1937 Mehr .......... 439/29
3,033,913 A * 5/1962 Dietze .......... 174/159 X
3,256,428 A * 6/1966 Schwartz .......... 220/4.02 X
5,658,152 A * 8/1997 Selker .......... 439/31
6,362,421 B1 * 3/2002 Layton, Jr. .......... 174/50
6,433,274 B1 * 8/2002 Doss et al. .......... 174/50
6,452,108 B1 * 9/2002 Major .......... 174/135
6,486,397 B2 * 11/2002 Lee .......... 174/50

* cited by examiner

*Primary Examiner*—Anthony Dinkins
*Assistant Examiner*—Dhiru R Patel
(74) *Attorney, Agent, or Firm*—Rosenberg, Klein & Lee

(57) ABSTRACT

A power supply adapter with a foldable plug is disclosed. The power supply adapter includes a first casing, a second casing, a rotatable cylinder, a projecting plug, and a lighter connector. A cavity is formed on the front end of the first casing. Two vertical plates are mounted on the second casing for supporting the rotatable cylinder. A lighter connector is connected to the front end of the projecting plug for insertion into a lighter socket. The projecting plug is formed on the front end of the rotatable cylinder and extends from a cavity space defined by the front end of the first casing and the second casing. By rotating the rotatable cylinder, the angle of the projecting plug is changed. A voltage converting circuit is arranged in the adapter for supplying a first and a second output voltage.

10 Claims, 11 Drawing Sheets

POWER SUPPLY ADAPTER WITH FOLDABLE PLUG

BACKGROUND OF THE INVENTION

1. Field of the Invention

The present invention relates to a power supply adapter, and more particularly relates to a power supply adapter with a foldable plug which has bendable structure and dual power outputs.

2. Description of the Prior Art

As shown by FIG. 1, the conventional mobile phone power supply adapter includes a cord 11 extending from one end of the adapter casing 1. The other end of cord 11 is connected with a lighter plug 12 which may be inserted into a known cigarette lighter. A cord 13 extends from the other end of the adapter casing 1 and is connected with a power output plug 14 which may be inserted into a power input socket of a mobile phone. Currently, cigarette lighter becomes a standard accessory in cars and is also commonly available in airplanes.

In addition to the automobile lighter, power socket specially designed for mobile phones and notebooks is also equipped under the seats of airplane. As shown in FIG. 2, a cord 21 extends from one end of the power supply adapter casing 2. Then the cord 21 is connected to a plug section 22, which is inserted into a standard double-hole socket. The plug section 22 includes two metal prongs 221, 222 and a buckle 223 on the front ring end thereof. A cord 23 extends from the other end of the power supply adapter casing 2 and is connected to a mobile phone plug 24 for insertion into a power input socket of a mobile phone (not shown). However, the front end of the plug section 22 is connected to a connector 25 before plugging in and using a cigarette lighter for power supply. The front end of connector 25 is a cigarette lighter socket 251, while the rear end is a double-hole socket 252. There is two contact holes 253, 254 and an opening area 255 one the double-hole socket 252. When the plug section 22 is connected into the double-hole socket 252, the metal prongs 221, 222 are precisely inserted into the contact holes 253, 254 of the double-hole socket 252, and the buckle 223 fastens the opening area 255.

The power connecting device becomes extraordinarily long after the foregoing process is completed. Users may encounter unexpected difficulties. The power connecting device may be easily obstructed by the nearby objects.

Moreover, some users may use more than two electrical appliances (such as mobile phone and portable computer) at the same time and therefore, two different adapters are required. In other words, it is very inconvenient that users have to bring and use extra adapters constantly.

SUMMARY OF THE INVENTION

Thus, an object of the present invention is to provide a power supply adapter with a foldable plug, which can be folded up to an appropriate angle according to application situation.

Another object of the invention is to provide an adapter with improved structure, which can effectively reduce the length of whole connection, and minimize the space requirement at use.

Another object of the present invention is to provide a power supply adapter with extended cable and connector for connecting and charging a mobile phone or another electrical appliances. The adapter is further formed with a battery receptacle thereon for charging a mobile phone battery.

The present invention will be apparent in its contents of technique after reading the detailed description of the preferred embodiments of the present invention in reference to the accompanying drawings, wherein:

DETAILED DESCRIPTION OF THE PREFERRED EMBODIMENT

Figure 1:
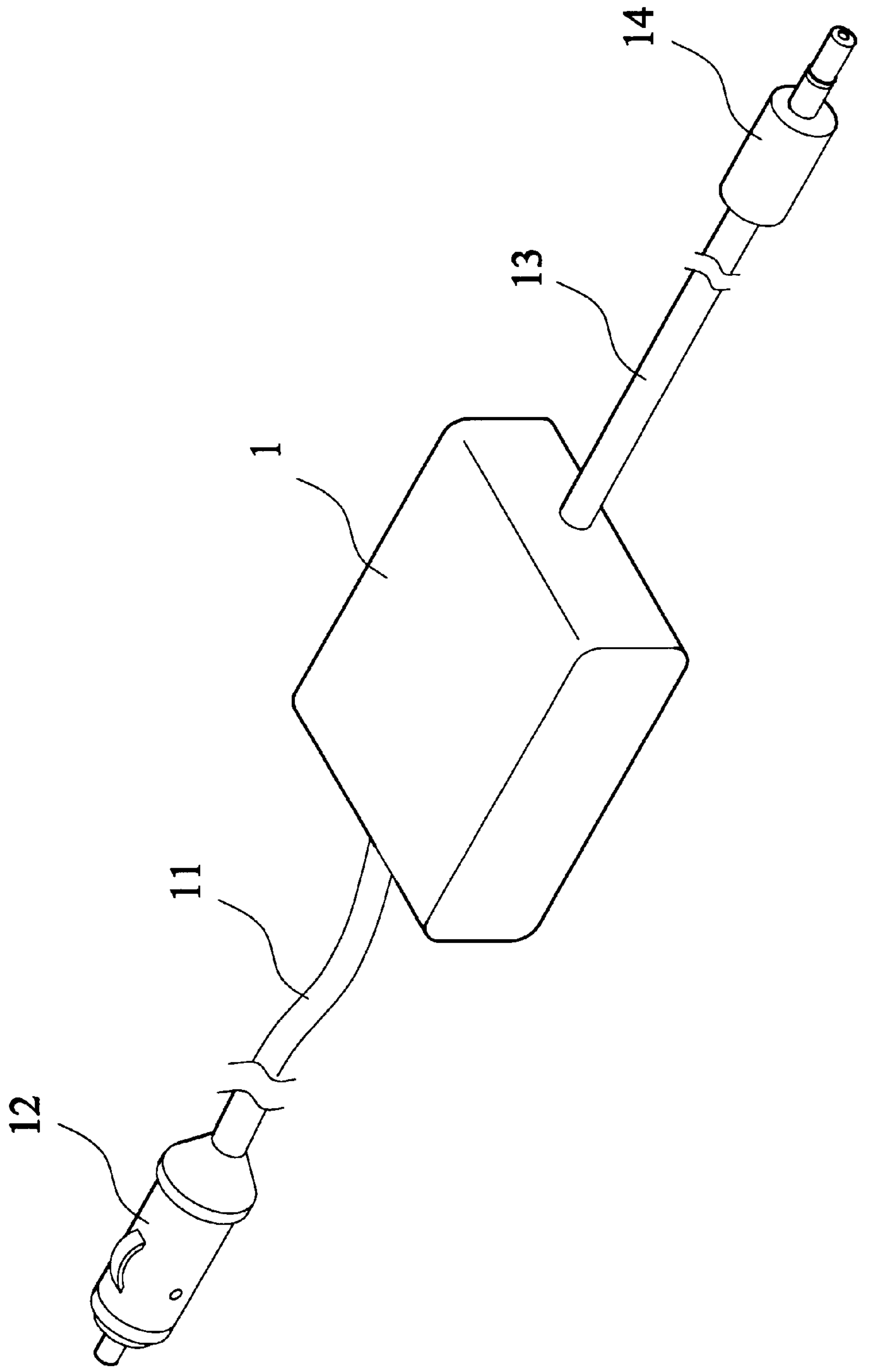
FIG.1(Prior Art)
FIG. 1 is a perspective view showing the conventional power supply adapter.
Figure 2:
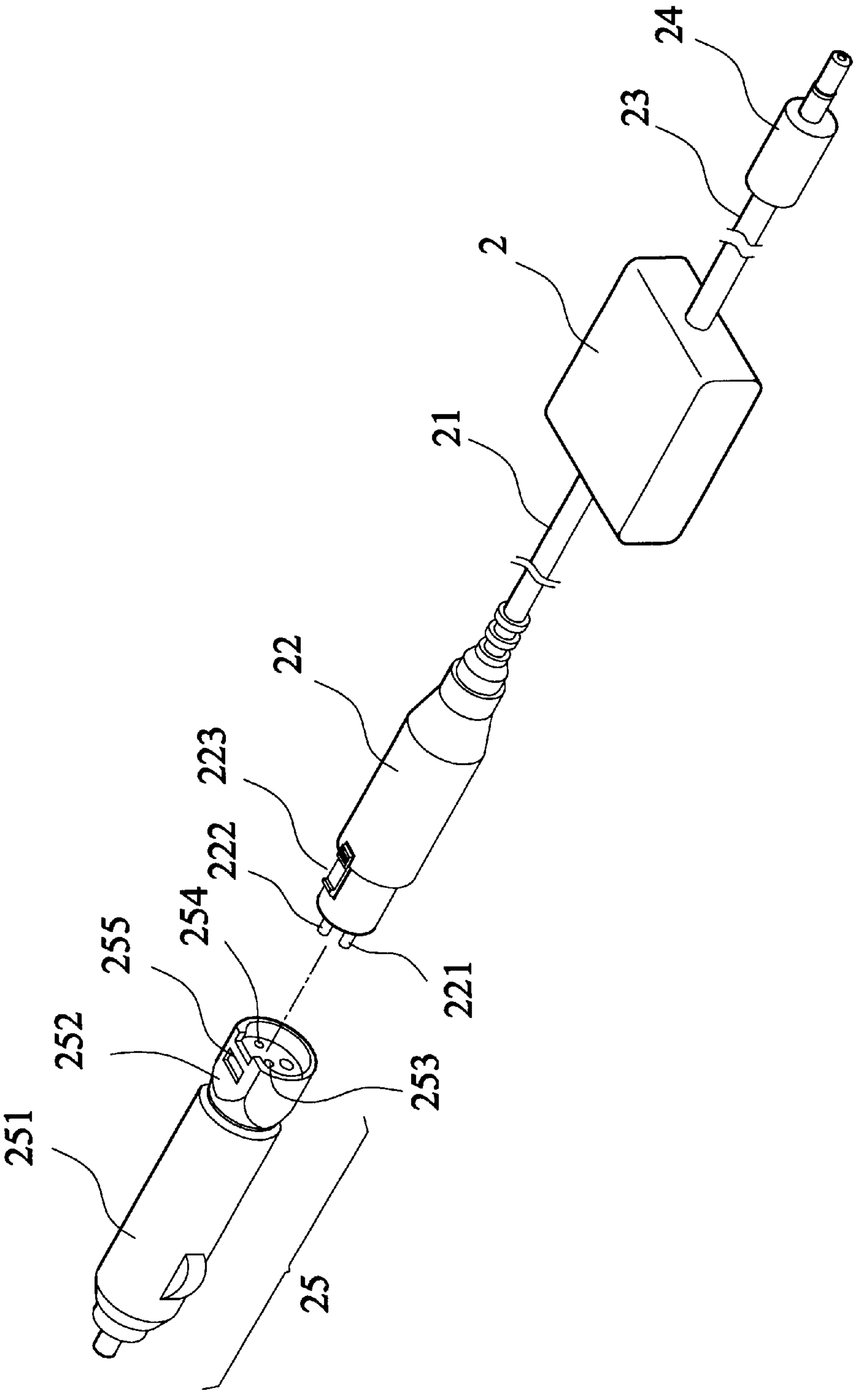
FIG.2(Prior Art)
FIG. 2 is a perspective view showing another type of conventional power supply adapter.

As shown in FIGS. 3 through 6, the power supply adapter 3 in accordance with a first embodiment of the present invention comprises a first casing 3*a*, a second casing 3*b*, a rotatable cylinder 4, a projecting plug 5, and a lighter connector 6. A cord 31 extends from one end of the power supply adapter 3 and is connected to a plug 32 which can be plugged into a power input socket of an electrical appliance, such as a mobile phone.

Figure 6:
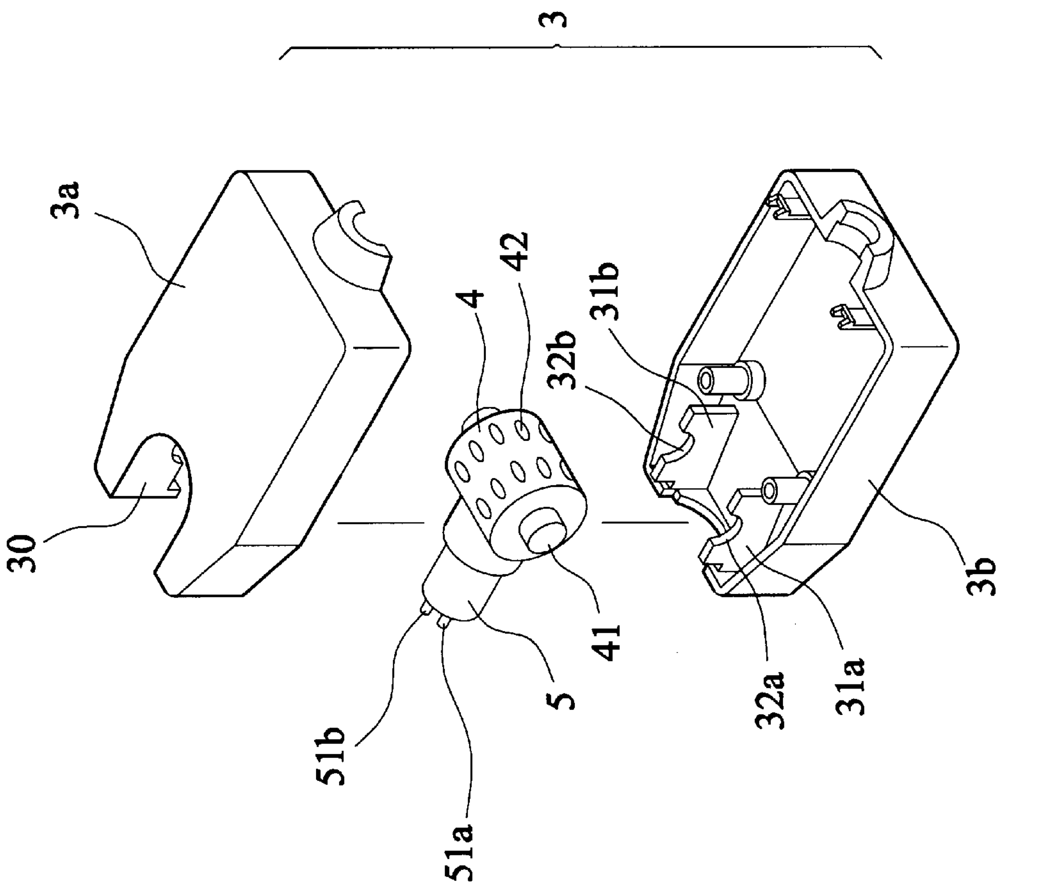
FIG. 6 is the exploded view showing the power supply adapter with foldable plug of the present invention.

The front end of the first casing 3*a* is formed with a U-shaped cavity 30, as shown in FIG. 6. The second casing 3*b* is coupled with the first casing 3*a* forming an inner space therein to accommodate a circuit board (not shown).

A supporting structure is disposed in the second casing 3*b* corresponding to the cavity 30 of the front end of the first casing 3*a*. The supporting structure comprises two vertical plates 31*a*, 31*b*. Two curved portions 32*a*, 32*b* are formed on the top edges of the vertical plates 31*a*, 31*b* respectively for supporting the rotatable cylinder 4. When the second casing 3*b* and the first casing 3*a* are fixed together, an operating space is formed by the cavity 30 for the rotatable cylinder 4.

Two trunnions 41 extend from both sides of the rotatable cylinder 4 and are pivotally supported on the curved portions 32*a*, 32*b* of the vertical plates 31*a*, 31*b* of the second casing 3*b*. A plurality of concave portions 42 are formed on the surface of the rotatable cylinder 4 to provide the sense of positioning when user turns the rotatable cylinder 4.

The projecting plug 5 is formed on the front end of the rotatable cylinder 4 and extends from the cavity space 30 defined by the front end of the first casing 3*a* and the second casing 3*b*. By rotating the rotatable cylinder 4, the angle of the projecting plug 5 can be changed. Two prongs 51*a*, 51*b* are protruded out at the front end of the projecting plug 5.

Figure 7:
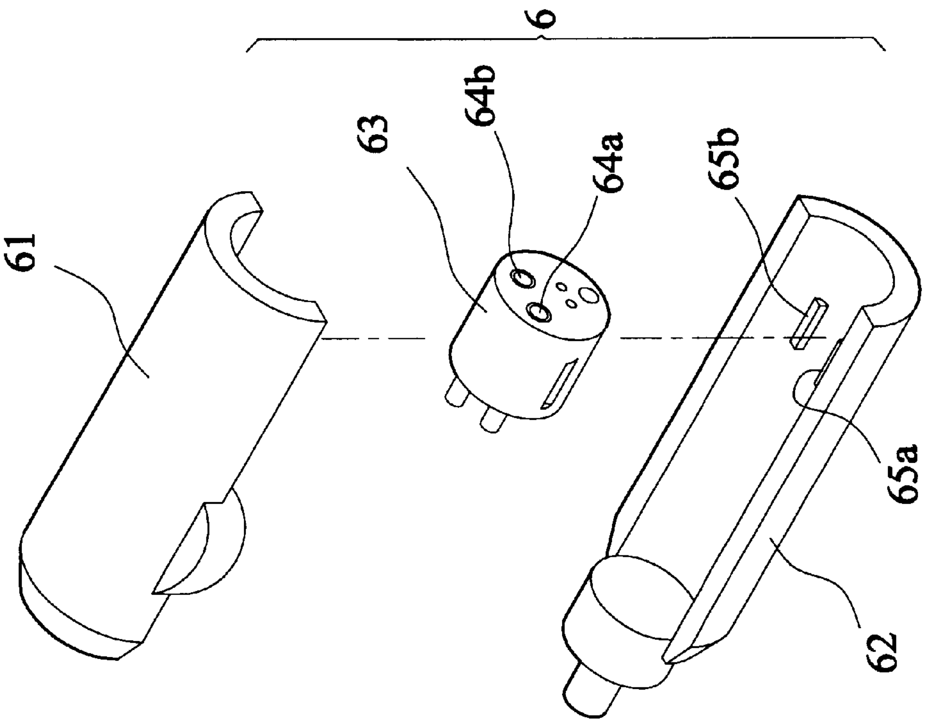
FIG. 7 is an exploded view showing the connector of the present invention.

A lighter connector 6 can be connected to the front end of the projecting plug 5. The structure of the lighter connector 6 is shown in FIG. 7. The lighter connector 6 includes an upper casing 61, a lower casing 62, and a double-hole socket 63. The upper casing 61 and the lower casing 62 are fixed to form a plug section and can be inserted into a standard lighter socket.

An inner space is formed between the upper casing 61 and the lower casing 62. A pair of ribs 65*a*, 65*b* or similar structure are formed on the inner wall of the lower casing 62, so that the double-hole socket 63 can be stably positioned in the inner space in the lighter connector 6. Two circular contact holes 64*a*, 64*b* are formed at the rear end of the double-hole socket 63 for plugging of prongs 51*a*, 51*b* at the front end of the projecting plug 5.

Figure 8:
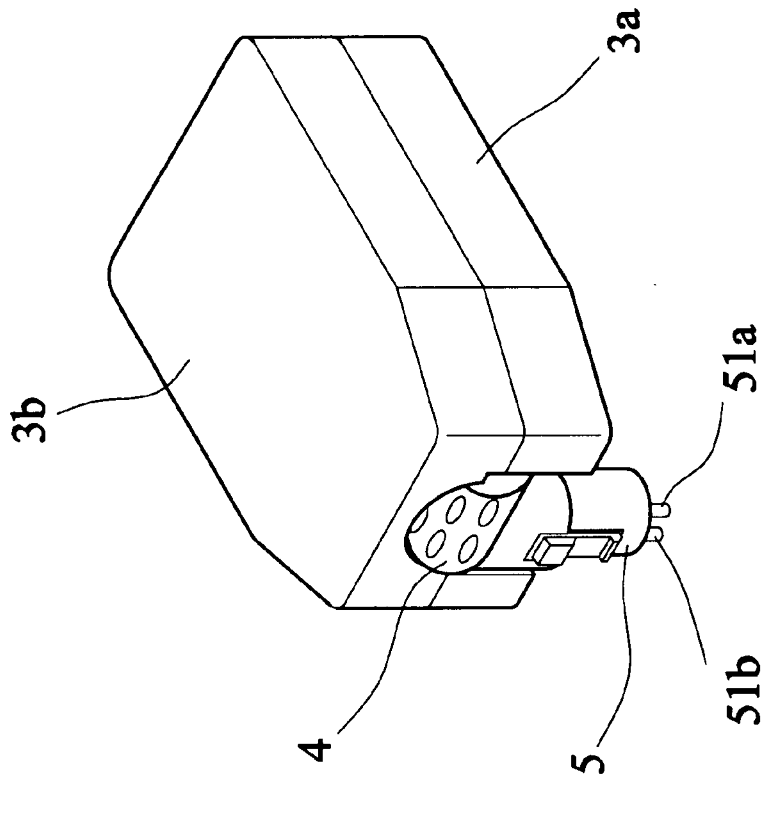
FIG. 8 is a perspective view showing the projecting plug of the power supply adapter with foldable plug at bending to one side.

As disclosed by the foregoing description, the power supply adapter of the prevention invention can be bent to a desirable angle, as shown in FIG. 8, so as not to be obstructed by the nearby objects. The improved structure of present invention effectively reduces the length of the connection part, thereby minimizes the space needed for plug-in.

Figure 3:
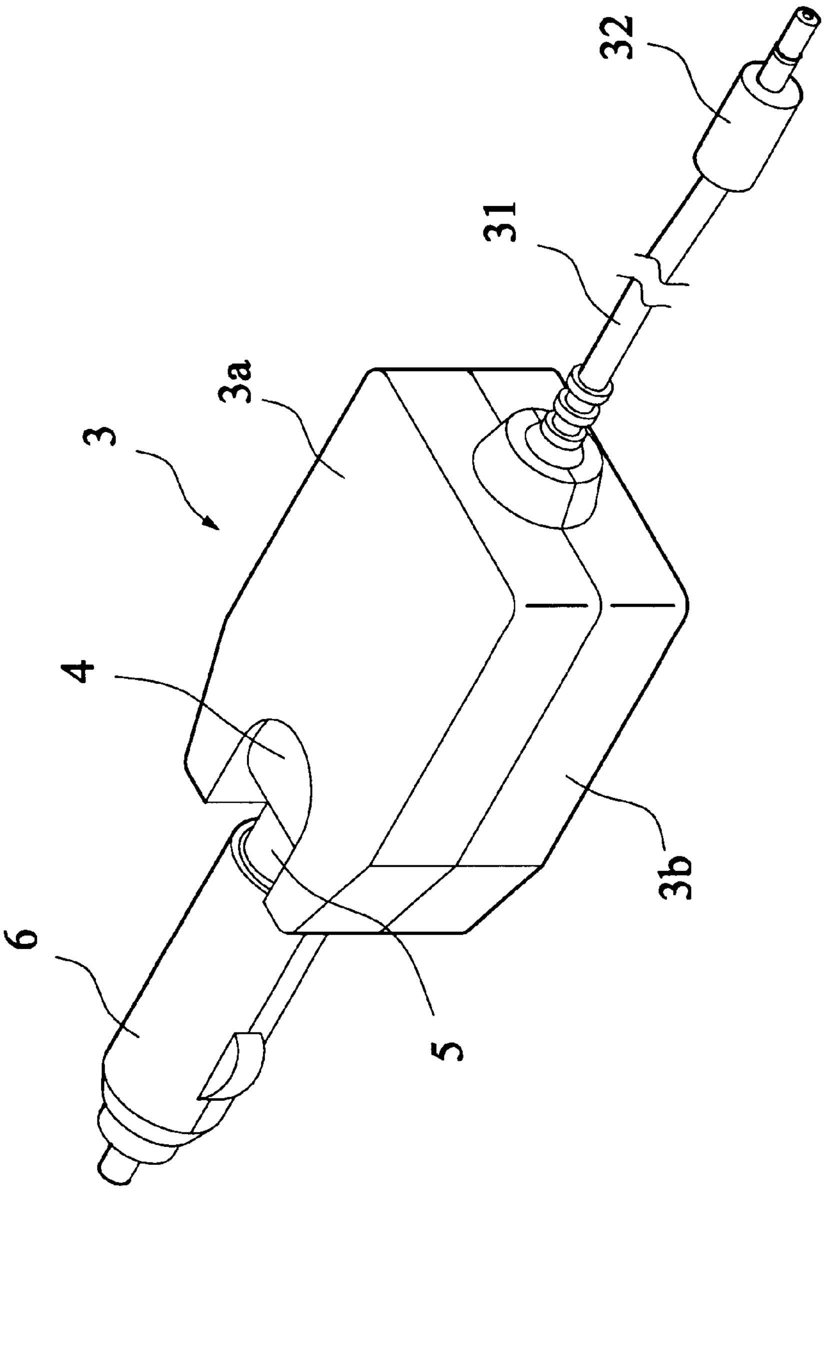
FIG. 3 is a perspective view of a preferred embodiment of the present invention.
Figure 4:
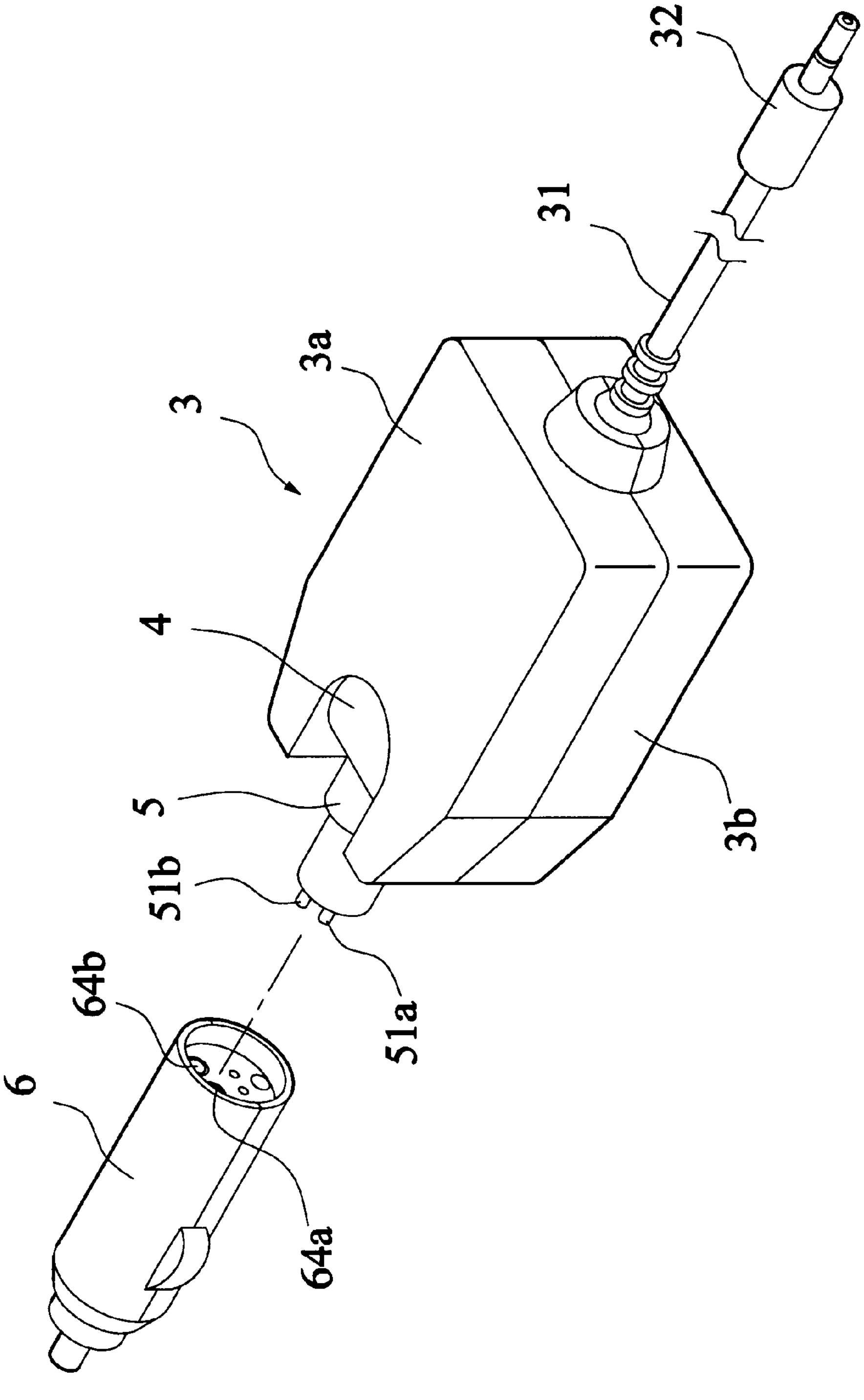
FIG. 4 is a perspective view showing the projecting plug when disconnected from the connector of the present invention.
Figure 5:
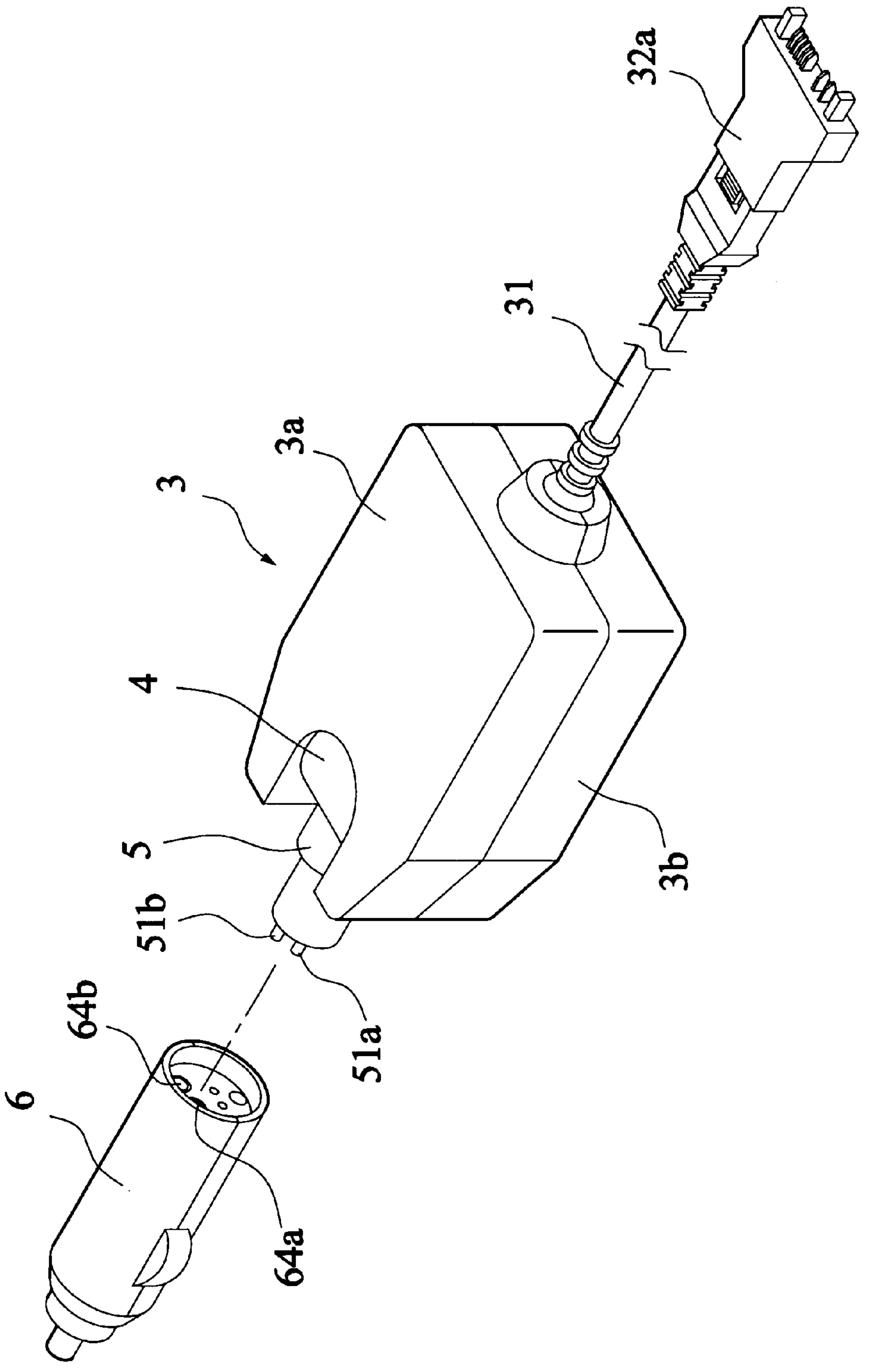
FIG. 5 shows the connection of another type of plug of mobile phone to the present invention in FIG. 4.
Figure 9:
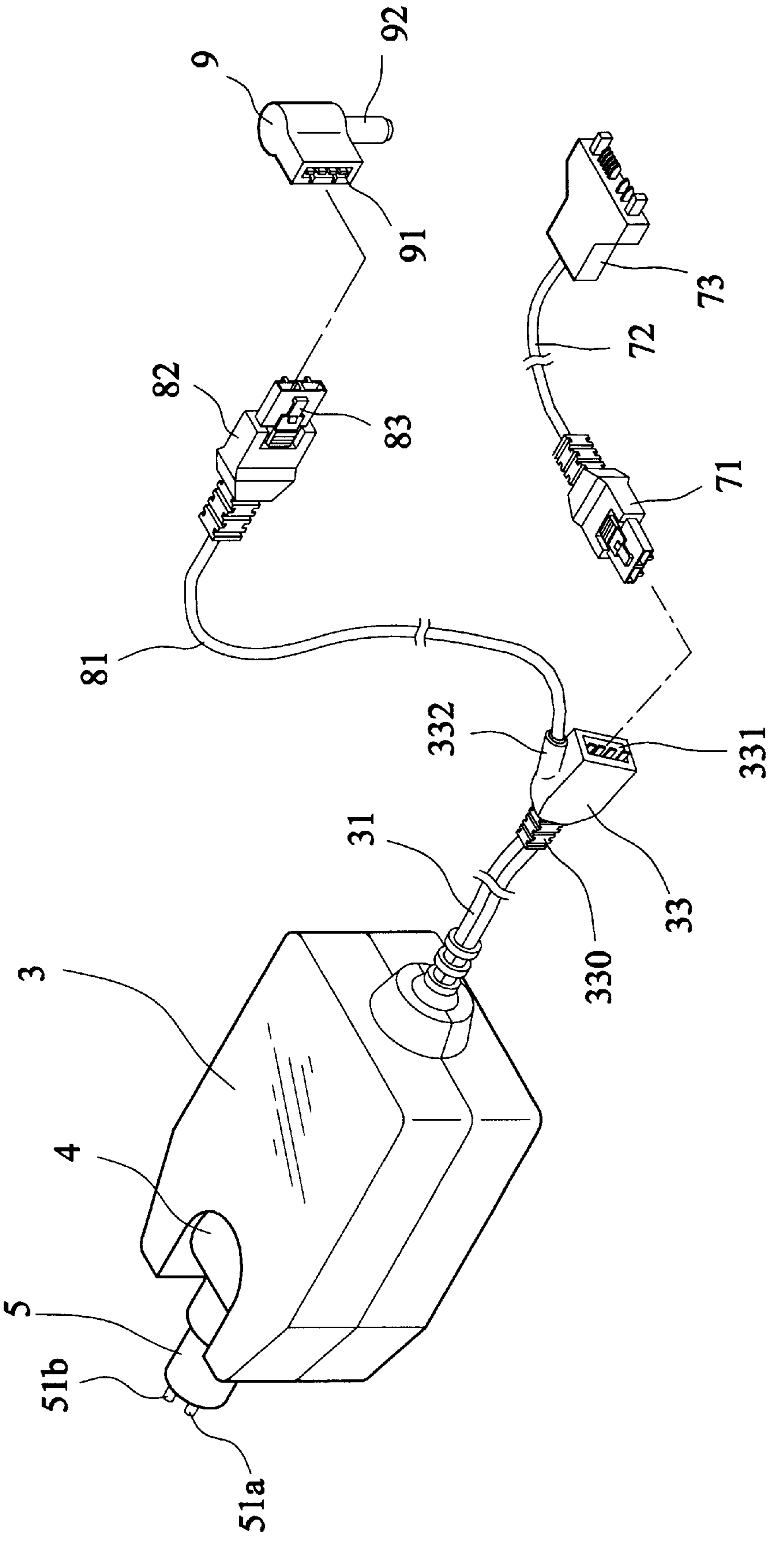
FIG. 9 is a perspective view of another embodiment of the present invention showing a multiple output terminals equipped for different voltage outputs.
Figure 10:
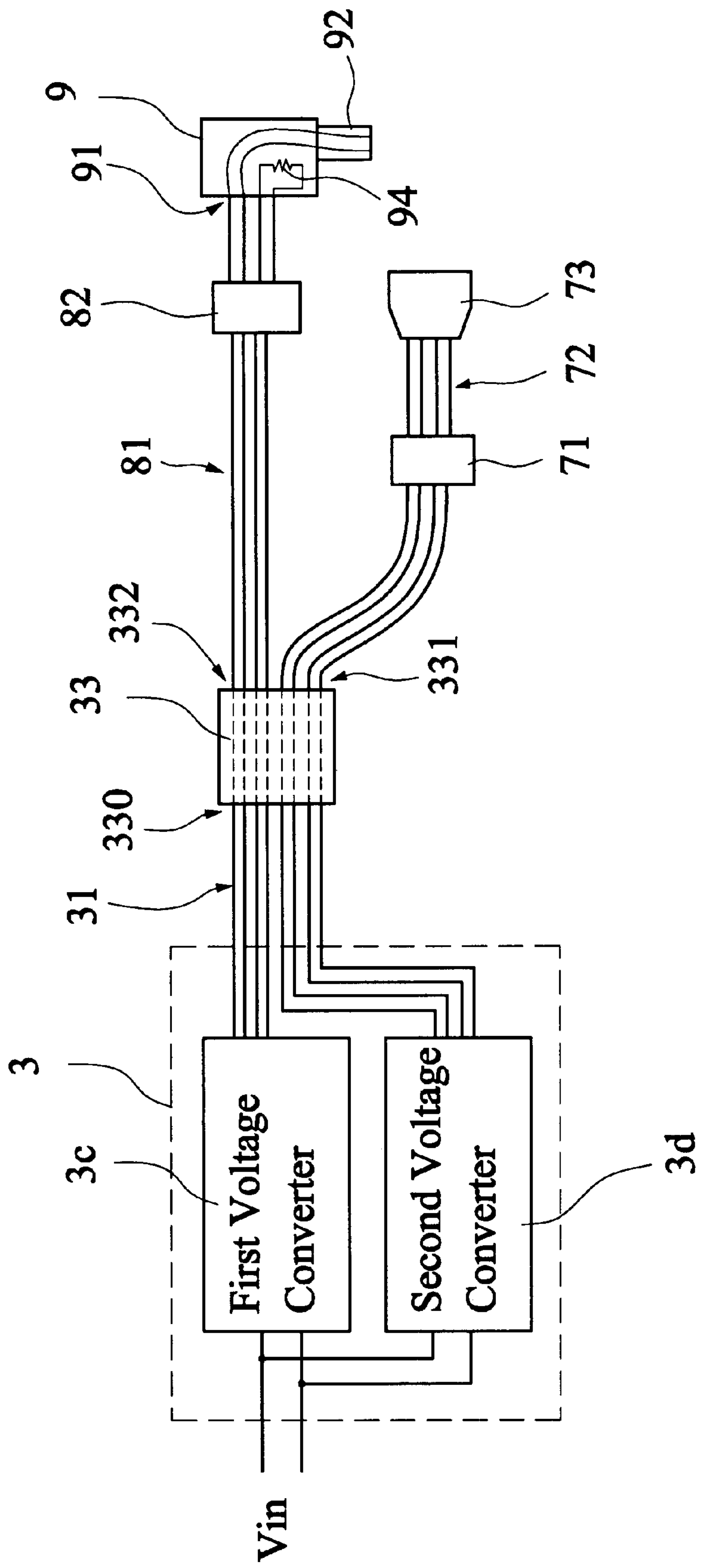
FIG. 10 is a schematic circuit diagram of the power supply adapter of with foldable plug of FIG. 9.

The plug 32 shown in FIG. 3 only provides a single voltage output. However, in the second embodiment of the present invention, dual voltage outputs can be provided with dual output terminals as shown in FIG. 9. FIG. 10 is a schematic circuit diagram of the power supply adapter of FIG. 9.

In this embodiment, a voltage converting circuit may be arranged in the adapter 3 for voltage conversion, which includes a first voltage converter 3*c* and a second voltage converter 3*d* for converting the input power source Vin. The first voltage converter 3*c* and the second voltage converter 3*d* are capable of respectively supplying output voltages with different voltage levels through the cord 31.

One end of the cord 31 is connected to the adapter 3, and the other end is connected to a branch connector 33 which comprises a first voltage output terminal 331 and a second voltage output terminal 332. The first voltage output terminal 331 is connected to a first voltage converting circuit, and the second voltage output terminal 332 is connected to a second voltage converting circuit.

The first voltage converting circuit comprises a connector 71, an extended cable 72 and an output plug 73 which can be plugged to a power socket of a mobile phone (not shown).

The second voltage converting circuit comprises an extended cable 81, an output plug 82 which can be plugged to a socket terminal 91 of a voltage convertible plug 9. The output terminal 92 of the voltage convertible plug 9 supplies a second voltage to an electrical appliance, such as a portable computer (not shown).

Figure 11:
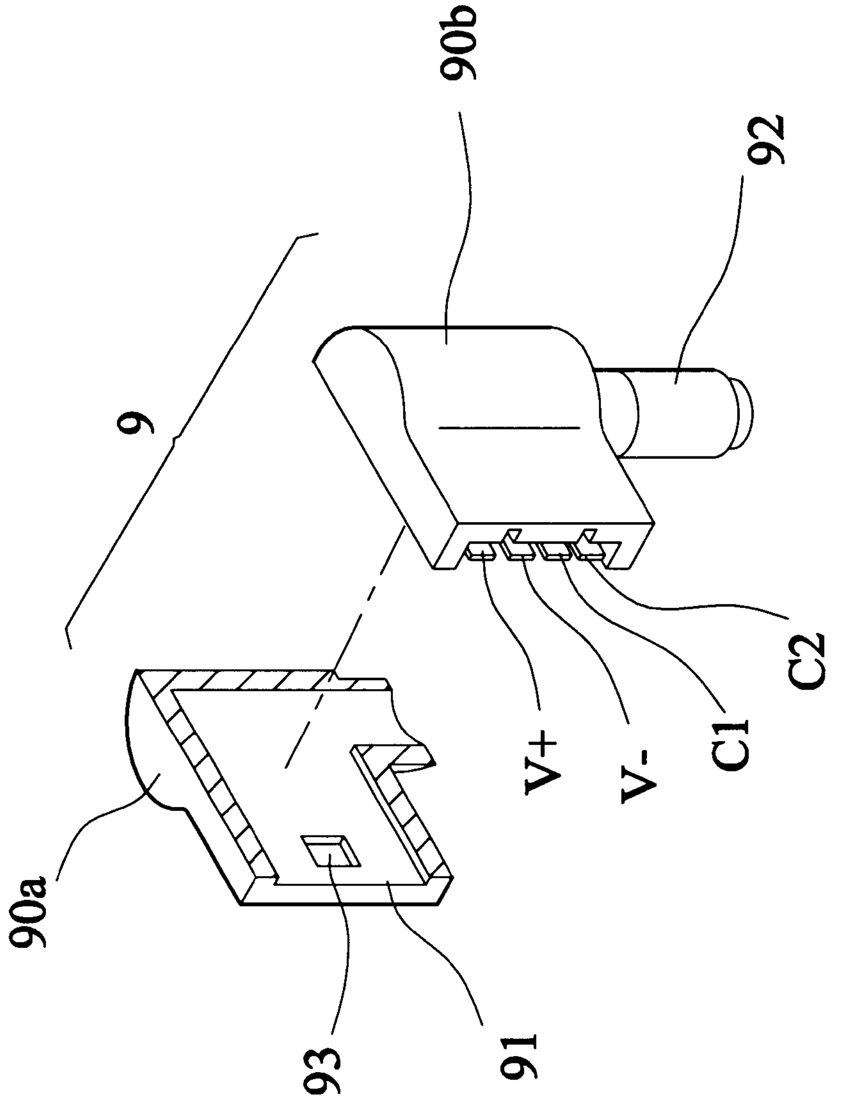
FIG. 11 is the exploded view of the output-voltage changeable plug of FIG. 9.

FIG. 11 shows that the voltage convertible plug 9 includes corresponding casings 90*a*, 90*b*, an input terminal 91 corresponding to the plug terminal of the output plug 82, and an output terminal 92 for supplying a converted output voltage. A positive power source input terminal V+, a negative power source input terminal V−, and two feedback element connecting terminals C1, and C2 are arranged in the input terminal 91.

With reference to FIGS. 9 and 11, on the inner wall of the casing 90*a* of the voltage convertible plug 9 is formed with a window 93 corresponding to a lock 83 formed on the output plug 82.

A feedback element 94 is connected across the feedback element connecting terminals C1 and C2 of the voltage convertible plug 9. The feedback element 94 may be a resister, as shown in FIG. 10, serving as a feedback element for the first voltage converter 3*c*. The resistance of the resister determines the output voltage level of output terminal 92 of the voltage convertible plug 9. When the other voltage convertible plug 9 containing a resister with different resistance is connected to the output plug 82, the output voltage level presented on the output terminal 92 of the voltage convertible plug 9 is changed.

Although the present invention has been described with reference to the preferred embodiments, it is apparent to those skilled in the art that a variety of modifications and changes may be made without departing from the scope of the present invention which is intended to be defined by the appended claims.

What is claimed is:

1. A power supply adapter comprising:

a casing having a first casing and a second casing, defining an inner space therein, a cavity being formed on a front end of the first casing and a supporting structure being formed on the second casing;

a cord extending from a rear end of the casing and being connected with a plug structure at a free end thereof;

a rotatable cylinder pivotally supported on the front end of the casing of the adapter by the supporting structure; and a projecting plug, formed on the rotatable cylinder and outwardly extended from the cavity defined by the first casing.

2. The power supply adapter as claimed in claim 1, wherein the rotatable cylinder is provided with two trunnions extending from both sides of the rotatable cylinder and pivotally supported by the supporting structure of the second casing.

3. The power supply adapter as claimed in claim 1, the supporting structure of the second casing comprising two vertical plates mounted on the second casing, and two curved portions being formed on the top edges of the vertical plates respectively for supporting the rotatable cylinder.

4. The power supply adapter as claimed in claim 1, wherein the rotatable cylinder is further formed with a plurality of concave portions thereon.

5. The power supply adapter as claimed in claim 1, wherein the projecting plug is provided with two prongs extended on a front end thereof.

6. The power supply adapter as claimed in claim 1, a lighter connector being further connected to a front end of the projecting plug.

7. The power supply adapter as claimed in claim 6, wherein the lighter connector comprises:

an upper casing;

a lower casing coupled with the upper casing to form an inner space therebetween;

a positioning structure formed in the inner space between the upper casing and the lower casing; and a double-hole socket disposed in the positioning device.

8. The power supply adapter, as claimed in claim 1, wherein the plug structure comprises:

a first voltage output terminal for supplying a first voltage, further comprising:

a connector coupled to the plug structure;

an output plug adapted to be plugged to a power socket of a mobile phone; and an extended cable connected between the connector and the output plug;

a second voltage output terminal for supplying a second voltage, further comprising:

an output plug;

an extended cable connected between the output plug and the second voltage output terminal; and a voltage convertible plug connected to the output plug for supplying the second voltage.

9. The power supply adapter as claimed in claim 8, wherein the voltage convertible plug comprises:

a casing;

an input terminal mounted in the casing, adapted to be connected to the output plug of the second voltage output terminal, comprising a positive power source input terminal, a negative power source input terminal, and two feedback element connecting terminals;

an output terminal for supplying a converted output voltage; and a feedback element disposed inside the casing connected across the feedback element connecting terminals for determination of an output voltage level of the second voltage output terminal.

10. The power supply adapter as claimed in claim 9, wherein the casing comprises:

an upper casing, formed with a window corresponding to a lock formed on the output plug of the second voltage output terminal; and a lower casing coupled to the upper casing.

* * * * *